United States Patent
Koike et al.

(10) Patent No.: US 10,350,920 B2
(45) Date of Patent: Jul. 16, 2019

(54) PRINTING APPARATUS AND POWER SUPPLY UNIT FOR PRINTING APPARATUS

(71) Applicant: SEIKO EPSON CORPORATION, Tokyo (JP)

(72) Inventors: Hirofumi Koike, Nagano (JP); Tomonori Yamada, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/840,108

(22) Filed: Dec. 13, 2017

(65) Prior Publication Data

US 2018/0170079 A1 Jun. 21, 2018

(30) Foreign Application Priority Data

Dec. 21, 2016 (JP) .................................. 2016-248102

(51) Int. Cl.
*B41J 23/00* (2006.01)
*B41J 29/38* (2006.01)
(Continued)

(52) U.S. Cl.
CPC .............. *B41J 23/00* (2013.01); *B41J 29/38* (2013.01); *B41J 29/393* (2013.01); *H02H 1/00* (2013.01);
(Continued)

(58) Field of Classification Search
CPC . B41J 23/00; B41J 29/38; B41J 29/393; B41J 2/01; B41J 2/04541; B41J 2/04553;
(Continued)

(56) References Cited

U.S. PATENT DOCUMENTS 4,710,783 A  12/1987 Caine et al.
2004/0119770 A1  6/2004 Tamura
(Continued)

FOREIGN PATENT DOCUMENTS

CN  101267161 A1  9/2008
CN  102857108 A1  1/2013
(Continued)

OTHER PUBLICATIONS

The Extended European Search Report for the corresponding European Patent Application No. 17207556.6 dated May 8, 2018.

*Primary Examiner* — Huan H Tran
*Assistant Examiner* — Alexander D Shenderov

(57) ABSTRACT

A printing apparatus that has a plurality of functions including a printing function and is capable of executing printing with resolution of 300 dpi or more includes a plurality of operating units including a printing unit and a power supply unit. The power supply unit includes a substrate, an input terminal that receives an alternating voltage, a smoothing capacitor that smooths the alternating voltage, a thermistor that detects a temperature, and a comparator that compares a signal output from the thermistor with a standard signal and outputs a notification signal. The input terminal, the smoothing capacitor, the thermistor, and the comparator are mounted on the substrate. The supply of power from the power supply unit is stopped based on the state of the notification signal. A gap between the input terminal and the thermistor is longer than a gap between the input terminal and the smoothing capacitor.

22 Claims, 10 Drawing Sheets

(51) Int. Cl.

| | | |
|---|---|---|
| *B41J 2/01* | (2006.01) | |
| *H02H 1/00* | (2006.01) | |
| *H02H 5/04* | (2006.01) | |
| *H02M 1/32* | (2007.01) | |
| *H04N 1/00* | (2006.01) | |
| *B41J 29/393* | (2006.01) | |

(52) U.S. Cl.
CPC ........ *H02H 1/0007* (2013.01); *H02H 1/0023* (2013.01); *H02H 5/04* (2013.01); *H02M 1/32* (2013.01); *H04N 1/00899* (2013.01); *H04N 1/00978* (2013.01); *B41J 2/01* (2013.01)

(58) Field of Classification Search
CPC ............. B41J 2/04548; H04N 1/00899; H04N 1/00978; H02M 1/32; H02H 1/00; H02H 1/0007; H02H 1/0023; H02H 5/04
USPC ............................................................ 347/5
See application file for complete search history.

(56) References Cited

U.S. PATENT DOCUMENTS

| | | |
|---|---|---|
| 2008/0225559 A1 | 9/2008 | Yanada |
| 2013/0002746 A1 | 1/2013 | Takayanagi et al. |
| 2014/0362615 A1 | 12/2014 | Takayanagi et al. |

FOREIGN PATENT DOCUMENTS

| | | |
|---|---|---|
| EP | 1518696 A2 | 3/2005 |
| JP | 09-314915 A | 12/1997 |
| JP | 2008-187269 A | 8/2008 |

| | SI[m] (b1, b2) | Ts1 | | Ts2 | |
|---|---|---|---|---|---|
| | | SLa[m] | SLb[m] | SLa[m] | SLb[m] |
| LARGE DOT | (1, 1) | H | L | H | L |
| MIDDLE DOT | (1, 0) | H | L | L | H |
| SMALL DOT | (0, 1) | L | H | H | L |
| NON-DISCHARGE | (0, 0) | L | H | L | H |

PRINTING APPARATUS AND POWER SUPPLY UNIT FOR PRINTING APPARATUS

This application claims priority to Japanese Patent Application No. 2016-248102 filed on Dec. 21, 2016. The entire disclosure of Japanese Patent Application No. 2016-248102 is hereby incorporated herein by reference.

BACKGROUND

1. Technical Field

The present invention relates to a printing apparatus and a power supply unit for a printing apparatus.

2. Related Art

In recent years, printing apparatuses tend to have more functionality. For example, the following multifunctional printing apparatus has been developed. The multifunctional printing apparatus has a printing function of executing a printing process of forming an image on a recording medium (hereinafter merely referred to as "medium" in some cases) and at least one function among functions that exclude the printing function and are a copy function of executing a copy process of copying an image printed on a recording medium, a scanner function of executing a reading process of reading an image printed on a recording medium, generating digital image data indicating the read image, and storing the image data in a storage device or the like, a facsimile transmission function of executing a facsimile transmission process of transmitting the image data obtained by reading the image printed on the recording medium or the like to another printing apparatus (an example of an "external device") via a network, a facsimile reception function of executing a facsimile reception process of receiving image data transmitted from another printing apparatus and forming an image on a recording medium based on the received image data, and the like (refer to, for example, JP-A-2008-1887269).

In recent years, printing apparatuses tend to have high functionality, and the definition and speed of printing in printing processes tend to be increased (refer to, for example, JP-A-9-314915).

In general, if a printing apparatus has more functionality, and the definition and speed of printing of the printing apparatus are increased, the amount of power to be consumed by the printing apparatus increases. If the amount of power to be consumed by the printing apparatus increases, the amount of heat generated by a power supply unit, which is included in the printing apparatus and configured to convert an alternating voltage supplied from a commercial alternating power supply to a direct-current voltage able to be used in the printing apparatus, increases. Thus, if the printing apparatus has more functionality, and the definition or speed of the printing of the printing apparatus is increased, the temperature of the power supply unit included in the printing apparatus is likely to change to a high temperature, compared with the case where the printing apparatus is a monofunctional printing apparatus or the case where printing is executed with low definition or at a low speed. If the temperature of the power supply unit continues to be high, a failure may occur in the power supply unit, and the printing apparatus may not normally operate.

SUMMARY

An advantage of some aspects of the invention is that it solves at least a part of the aforementioned problems, and the invention can be achieved as the following aspects.

In order to solve the aforementioned problems, according to an aspect of the invention, a printing apparatus that has a plurality of functions including a printing function of forming an image on a medium and is capable of executing printing with resolution of 300 dpi or more includes a plurality of operating units including a printing unit that forms an image on a medium and a power supply unit that supplies power to the plurality of operating units. The power supply unit includes a substrate, an input terminal that receives an alternating voltage from a power cable electrically connected to an alternating power supply, a smoothing capacitor that smooths the alternating voltage input from the input terminal, a thermistor that detects a temperature, and a comparator that compares a signal output from the thermistor with a standard signal and outputs a notification signal. The input terminal, the smoothing capacitor, the thermistor, and the comparator are mounted on the substrate. The supply of power from the power supply unit is stopped based on the state of the notification signal. A gap between the input terminal and the thermistor is longer than a gap between the input terminal and the smoothing capacitor.

In general, since the input terminal included in the power supply unit and connected to the power cable is exposed to air outside the printing apparatus, the temperature of the input terminal is lower than the temperature of a portion included in the power supply unit and separated by a predetermined length or more from the input terminal. Thus, when the temperature of a part of the power supply unit changes to a high temperature, an effect of the change in the temperature of the part of the power supply on the temperature of the input terminal of the power supply unit is smaller than an effect of the change in the temperature of the part of the power supply on the temperature of the portion included in the power supply unit and separated by the predetermined length or more from the input terminal. On the other hand, in the aspect of the invention, since the thermistor is located farther from the input terminal than the smoothing capacitor, the aforementioned change in the temperature of the part of the power supply can be quickly detected after the change in the temperature of the part of the power supply unit to the high temperature, compared with the case where the thermistor is located closer to the input terminal than the smoothing capacitor. Thus, according to the aspect of the invention, it is possible to reduce a time period during which the temperature of the power supply unit continues to be high and it is possible to reduce the probability at which a failure may occur in the power supply unit or the printing apparatus due to a change in the temperature of the power supply unit to a high temperature.

To downsize the printing apparatus, the power supply unit may be downsized. If the power supply unit is downsized, a constituent element that releases heat generated in the power supply unit may be downsized. Thus, If the power supply unit is downsized, heat generated in the power supply unit may not be efficiently released and the temperature of the power supply unit is likely to change to a high temperature, compared with the case where the power supply unit is not downsized. On the other hand, in the aspect of the invention, since the thermistor is located farther from the input terminal than the smoothing capacitor, it is possible to quickly detect a change in the temperature of the power supply unit to a high temperature. Thus, according to the aspect of the invention, even if the power supply unit is downsized and the temperature of the power supply unit is likely to change to a high temperature, it is possible to reduce a time period during which the temperature of the power supply unit continues to be high and it is possible to reduce the probability at which a failure may occur in the power supply unit or the printing apparatus due to a change in the temperature of the power supply unit to a high temperature.

It is preferable that a gap between the input terminal and the thermistor be 3 centimeters (cm) or more in the printing apparatus.

In the power supply unit that converts an alternating voltage to a direct-current voltage, the amount of heat generated by the smoothing capacitor is likely to be higher than the other constituent elements of the power supply unit. The temperature of the input terminal of the power supply unit is likely to be lower than the other constituent elements of the power supply unit. Thus, according to this aspect, since the thermistor is located closer to the smoothing capacitor than to the input terminal in the power supply unit, it is possible to quickly detect a change in the temperature of the power supply unit to a high temperature and it is possible to reduce the probability at which a failure may occur in the power supply unit or the printing apparatus due to a change in the temperature of the power supply unit to a high temperature.

It is preferable that the smoothing capacitor be located between the thermistor and the input terminal in the printing apparatus.

According to this aspect, since the thermistor is located on the inner side of the power supply unit with respect to the smoothing capacitor when viewed from the input terminal, it is possible to quickly detect a change in the temperature of the power supply unit to a high temperature and it is possible to reduce the probability at which a failure may occur in the power supply unit or the printing apparatus due to a change in the temperature of the power supply unit to a high temperature.

It is preferable that, in the printing apparatus, the substrate have a first side and a second side opposite to the first side when the substrate is viewed in plan view, the input terminal be located closer to the first side of the substrate than to the second side of the substrate, and the thermistor be located closer to the second side of the substrate than to the first side of the substrate.

According to this aspect, since the thermistor is located far from the input terminal, it is possible to quickly detect a change in the temperature of the power supply unit to a high temperature and it is possible to reduce the probability at which a failure may occur in the power supply unit or the printing apparatus due to a change in the temperature of the power supply unit to a high temperature.

It is preferable that the printing apparatus include a housing covering sides that are among a plurality of sides of the substrate and exclude the first side when the substrate is viewed in plan view.

According to this aspect, since the thermistor is located at a position where heat release is likely to be prevented by the housing in the power supply unit, it is possible to quickly detect a change in the temperature of the power supply unit to a high temperature and it is possible to reduce the probability at which a failure may occur in the power supply unit or the printing apparatus due to a change in the temperature of the power supply unit to a high temperature.

It is preferable that, in the printing apparatus, the plurality of functions include at least a part or all of a copy function of copying an image printed on a medium, a reading function of reading an image printed on a medium, an image information transmission function of transmitting information indicating an image printed on a medium to an external device, and an image information reception function of forming an image on a medium based on information received from an external device and indicating the image.

According to this aspect, even if the printing apparatus has multifunctionality and the amount of heat generated in the power supply unit is large, it is possible to quickly detect a change in the temperature of the power supply unit to a high temperature and it is possible to reduce the probability at which a failure may occur in the power supply unit or the printing apparatus due to a change in the temperature of the power supply unit to a high temperature.

According to another aspect of the invention, a power supply unit for a printing apparatus that has a plurality of functions including a printing function of forming an image on a medium and is capable of executing printing with resolution of 300 dpi or more includes a substrate, an input terminal that receives an alternating voltage from a power cable electrically connected to an alternating power supply, a smoothing capacitor that smooths the alternating voltage input from the input terminal, and a thermistor that detects a temperature. The input terminal, the smoothing capacitor, and the thermistor are mounted on the substrate. A gap between the input terminal and the thermistor is longer than a gap between the input terminal and the smoothing capacitor.

According to this aspect, the thermistor is located farther from the input terminal than the smoothing capacitor, and if the temperature of a part of the power supply unit changes to a high temperature, it is possible to quickly detect the change in the temperature and it is possible to reduce the probability at which a failure may occur in the power supply unit or the printing apparatus due to a change in the temperature of the power supply unit to a high temperature.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
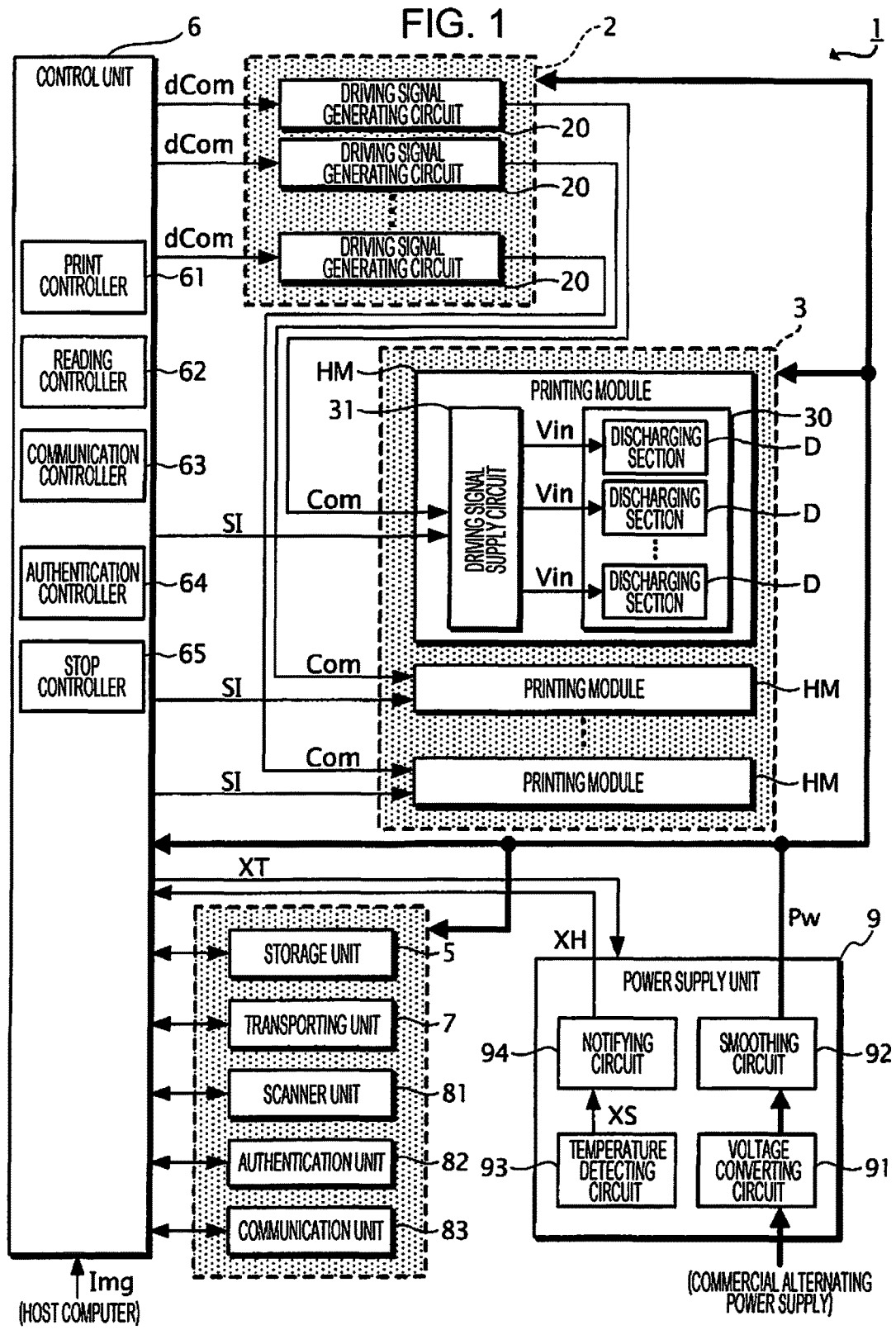
FIG. 1 is a block diagram showing an example of the configuration of an ink jet printer according to an embodiment of the invention.

Hereinafter, an embodiment of the invention is described with reference to the accompanying drawings. In the drawings, dimensions and reduced scale of units are different from those of the actual units for convenience sake. In addition, since the following embodiment is a preferred specific example of the invention, technically preferable limitations are imposed. However, unless a description that limits the invention is included in the following description, the scope of the invention is not limited to the embodiment and modified examples.

A. Embodiment

The embodiment describes a printing apparatus and exemplifies an ink jet printer that discharges ink (an example of a "liquid") and forms an image on recording paper P (an example of a "recording medium").

1. Overview of Ink Jet Printer

Figure 2:
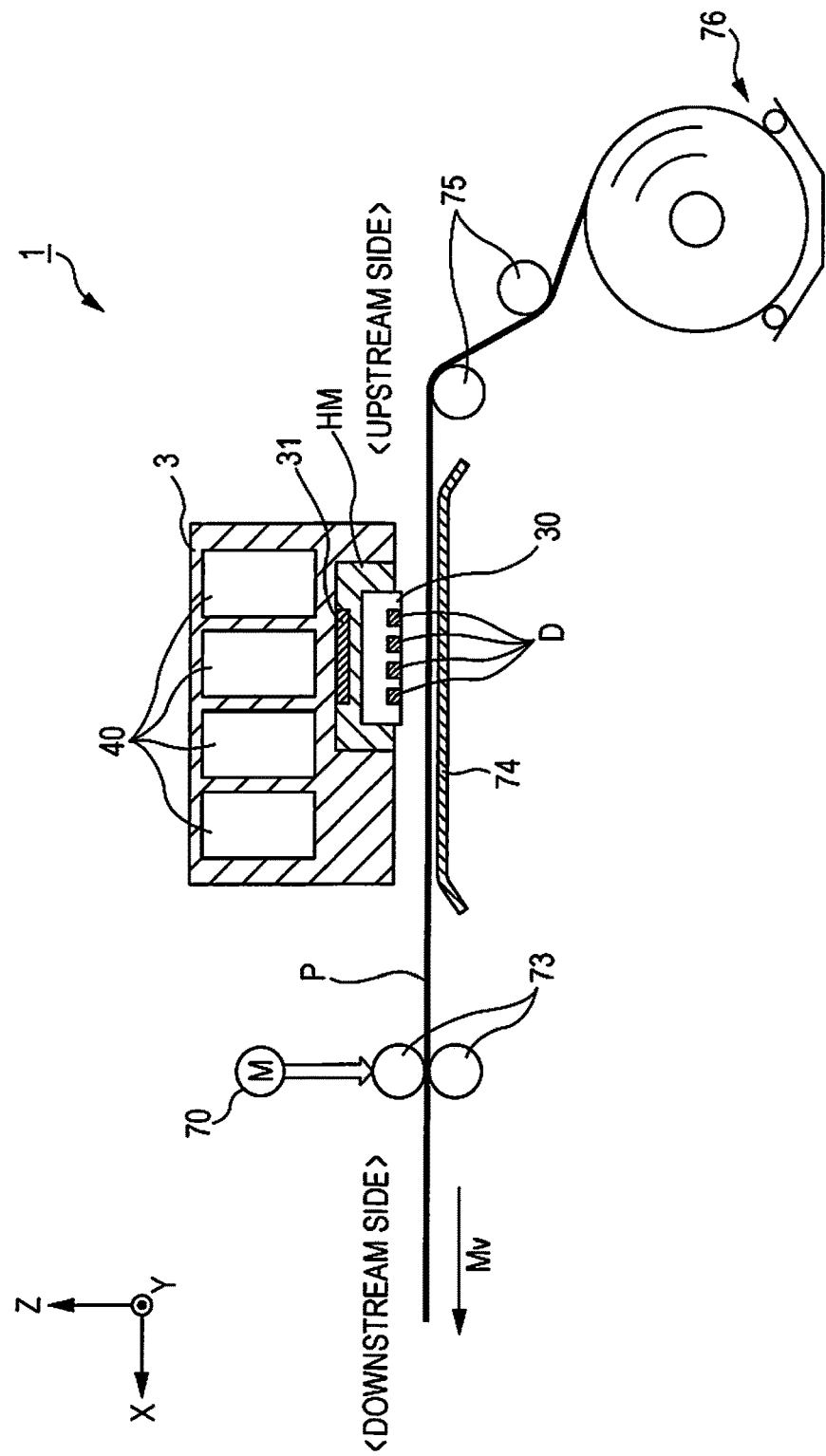
FIG. 2 is a cross-sectional view of an example of a schematic inner structure of the ink jet printer.

The configuration of the ink jet printer 1 according to the embodiment is described with reference to FIGS. 1 and 2. FIG. 1 is a functional block diagram showing an example of the configuration of the ink jet printer 1 according to the embodiment. FIG. 2 is a cross-sectional view showing an example of a schematic inner structure of the ink jet printer 1.

Printing data Img that indicates an image to be formed by the ink jet printer 1 is supplied to the ink jet printer 1 from a host computer (not shown) such as a personal computer or a digital camera. The ink jet printer 1 executes a printing process of forming, on the recording paper P, the image indicated in the printing data Img supplied from the host computer.

Although details are described later, the ink jet printer 1 according to the embodiment has a printing function of executing the printing process, a copy function (an example of a "copy function") of executing a copy process of copying an image printed on recording paper P, a scanner function (an example of a "reading function") of executing a reading process of reading an image printed on the recording paper P, generating image data Dat indicating the read image, and storing the generated image data Dat in an external storage device (for example, a storage device included in the host computer) of the ink jet printer 1 or a storage unit 5 included in the ink jet printer 1, a facsimile transmission function (an example of an "image information transmission function") of executing a facsimile transmission process of transmitting the image data Dat obtained by reading the image printed on the recording paper P to an external device via a network such as a public line, a facsimile reception function (an example of an "image information reception function") of executing a facsimile reception process of receiving image data Dat transmitted from an external device and forming an image on the recording paper P based on the received image data Dat, an authentication function of executing an authentication process on a user of the ink jet printer 1, and a stop function of executing a stop process of stopping the supply of power to the ink jet printer 1 when the ink jet printer 1 becomes a predetermined state.

In addition, although details are described later, the embodiment assumes that the ink jet printer 1 is a line printer as an example.

Figure 6:
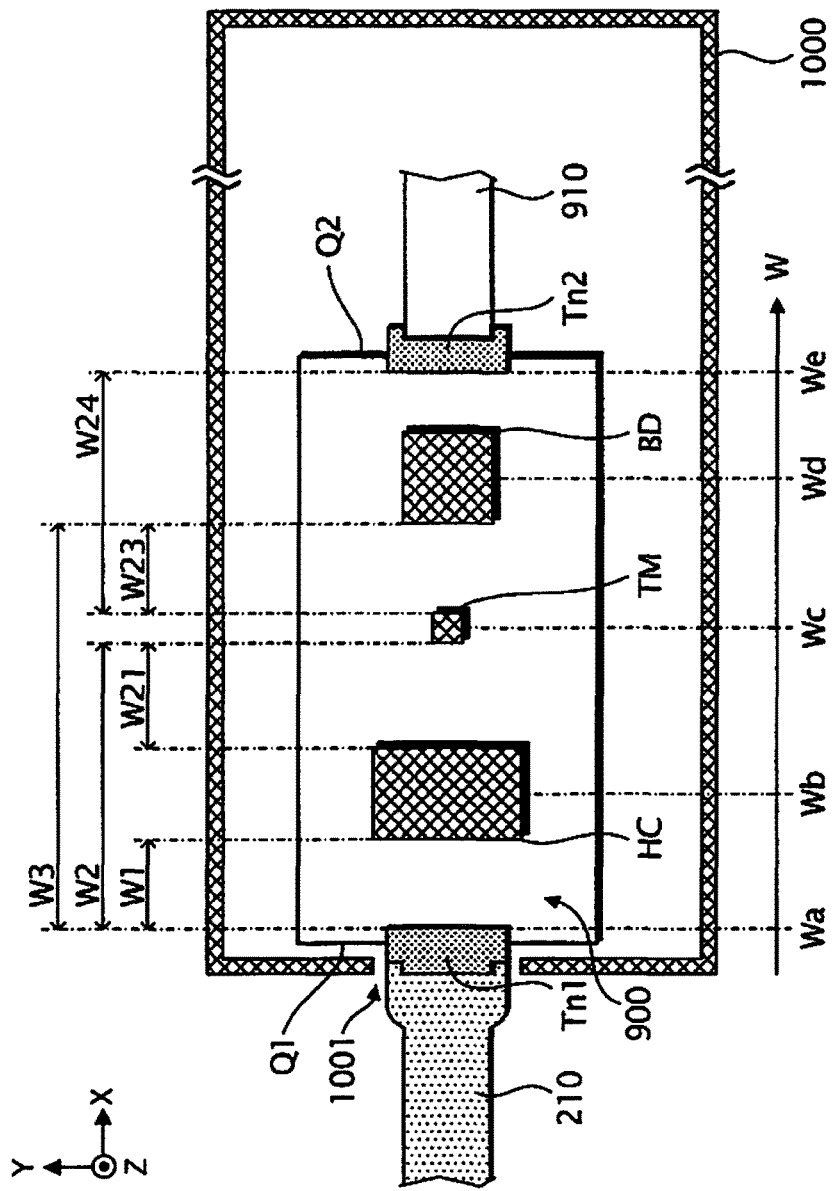
FIG. 6 is a plan view describing an example of the structure of the power supply unit.

As exemplified in FIG. 1, the ink jet printer 1 includes a printing unit 3, a control unit 6, a power supply unit 9, a driving signal generating unit 2, a transporting unit 7, the storage unit 5, a scanner unit 81, an authentication unit 82, a communication unit 83, and a housing 1000 (refer to FIG. 6). The printing unit 3 includes printing modules HM, each of which has discharging sections D for discharging ink. The control unit 6 controls operations of the units of the ink jet printer 1. The power supply unit 9 supplies power PW to the units of the ink jet printer 1. The driving signal generating unit 2 includes driving signal generating circuits 20 that generate driving signals Com for driving the printing unit 3 (specifically, the discharging sections D included in the printing unit 3). The transporting unit 7 changes a relative position of the recording paper P to the printing unit 3. The storage unit 5 stores a control program of the ink jet printer 1 and other information. The scanner unit 81 reads an image printed on the recording paper P. The authentication unit 82 executes authentication on the user of the ink jet printer 1. The communication unit 83 executes communication with the external device of the ink jet printer 1. The housing 1000 stores the units of the ink jet printer 1.

Hereinafter, the driving signal generating unit 2, the printing unit 3, the storage unit 5, the control unit 6, the transporting unit 7, the scanner unit 81, the authentication unit 82, and the communication unit 83 are referred to as "operating units" in some cases. In the embodiment, the power supply unit 9 can supply power PW to the multiple operating units included in the ink jet printer 1.

The embodiment assumes that the printing unit 3 includes the four printing modules HM and that the driving signal generating unit 2 includes the four driving signal generating circuits 20 that correspond to the four printing modules HM, respectively.

In the embodiment, each of the printing modules HM includes a print head 30 having a number M of discharging sections D and includes a driving signal supply circuit 31 that switches whether or not a driving signal Com output from the driving signal generating unit 2 is supplied to the print head 30 (M is a natural number satisfying $1 \leq M$).

Hereinafter, in order to distinguish a number M of discharging sections D included in each of the print heads 30, the number M of discharging sections are referred to as first, second, . . . , and M-th discharging sections D in some cases. In addition, an m-th discharging section D included in each of the print heads 30 is referred to as discharging section D[m] (a variable m is a natural number satisfying $1 \leq m \leq M$). Furthermore, in the case where a constituent element, a signal, or the like of the ink jet printer 1 corresponds to the number m of a discharging section D[m], an index [m] indicating that the constituent element, the signal, or the like corresponds to the number m of the discharging section D[m] is added to a symbol indicating the constituent element, the signal, or the like in some cases.

The storage unit 5 includes one or both of a volatile memory such as a random access memory (RAM) and a nonvolatile memory such as a read only memory (ROM), an electrically erasable programmable read only memory (EEPROM), or a programmable ROM (PROM) and stores the printing data Img supplied from the host computer and various types of information such as the control program of the ink jet printer 1.

The control unit 6 includes a central processing unit (CPU). The control unit 6 may include a programmable logic device such as a field-programmable gate array (FPGA) instead of the CPU or may include the CPU and the programmable logic device such as the FPGA.

The control unit 6 can function as a print controller 61, a reading controller 62, a communication controller 63, an authentication controller 64, and a stop controller 65 by causing the CPU included in the control unit 6 to execute the control program stored in the storage unit 5 and operating in accordance with the control program.

The print controller 61 generates printing signals SI for controlling the driving signal supply circuits 31 included in the printing unit 3, waveform specifying signals dCom for controlling the driving signal generating circuits 20 included in the driving signal generating unit 2, and a transport control signal for controlling the transporting unit 7.

The waveform specifying signals dCom are digital signals defining waveforms of driving signals Com.

In addition, the driving signals Com are analog signals for driving the discharging sections D. The driving signal generating circuits 20 include DA converting circuits and generate the driving signals Com having the waveforms defined in the waveform specifying signals dCom. The embodiment assumes that each of the driving signals Com includes a driving signal Com-A and a driving signal Com-B.

In addition, the printing signals SI are digital signals for specifying types of operations of the discharging sections D. Specifically, the printing signals SI specify the types of the operations of the discharging sections D by specifying whether or not the driving signals Com are supplied to the discharging sections D. Specifying the types of the operations of the discharging sections D is to specify whether or not the discharging sections D are to be driven, or is to specify whether or not ink is discharged from the discharging sections D upon the driving of the discharging sections D, or is to specify the amounts of ink to be discharged from the discharging sections D upon the driving of the discharging sections D.

The reading controller 62 generates a scanner control signal for controlling the scanner unit 81. The communication controller 63 generates a communication control signal for controlling the communication unit 83. The authentication controller 64 generates an authentication control signal for controlling the authentication unit 82. The stop controller 65 generates, based on a notification signal XH output from the power supply unit 9, a stop signal XT for controlling the power supply unit 9 in such a manner that the supply of power from the power supply unit 9 is stopped.

When the printing process is executed, the print controller 61 causes the printing data Img supplied from the host computer to be stored in the storage unit 5. Next, the print controller 61 generates various signals such as the printing signals SI, the waveform specifying signals dCom, and the transport control signal based on various types of data such as the printing data Img stored in the storage unit 5. Then, the print controller 61 controls the transporting unit 7 to cause the transporting unit 7 to change a relative position of the recording paper P to the printing unit 3 and controls the printing unit 3 to drive the discharging sections D based on the printing signals SI, the waveform specifying signals dCom, the transport control signal, and the various types of data stored in the storage unit 5. Thus, the print controller 61 adjusts whether or not the discharging sections D discharge ink, the amounts of ink to be discharged from the discharging sections D, the timing of the ink discharging, and the like, and controls the execution of the printing process of forming the image corresponding to the printing data Img on the recording paper P.

When the reading process is executed, the scanner unit 81 reads, based on the scanner control signal, an image printed on the recording paper P located at a position where the scanner unit 81 can read the image, and the scanner unit 81 generates image data Dat indicating the read image. Then, the reading controller 62 causes the image data Dat output from the scanner unit 81 to be stored in the storage unit 5 or an external storage device.

The copy process includes the reading process and the printing process.

In the copy process, the reading controller 62 executes the reading process and the scanner unit 81 generates the image data Dat. Next, the print controller 61 converts the image data Dat generated by the scanner unit 81 to printing data Img in a format suitable for the printing process of the ink jet printer 1 and causes the printing data Img to be stored in the storage unit 5. Next, the print controller 61 controls the units of the ink jet printer 1 in such a manner that the printing process is executed based on the printing data Img.

The facsimile transmission process includes the reading process and a process of transmitting the image data Dat.

In the facsimile transmission process, the reading controller 62 executes the reading process and the scanner unit 82 generates the image data Dat. Next, the communication unit 83 transmits, based on the communication control signal, the image data Dat generated by the scanner unit 81 to the external device via the network.

The facsimile reception process includes a process of receiving image data Dat and the printing process.

In the facsimile reception process, the communication unit 83 receives the image data Dat from the external device based on the communication control signal. Next, the print controller 61 converts the image data Dat received by the communication unit 83 to printing data Img in the format suitable for the printing process of the ink jet printer 1 and causes the printing data Img to be stored in the storage unit 5. Next, the print controller 61 controls the units of the ink jet printer 1 in such a manner that the printing process is executed based on the printing data Img.

When the authentication process is executed, the authentication unit 82 reads, based on the authentication control signal, authentication information that is to be used for user authentication and is biological information of the user, IC card information recorded in an IC card owned by the user, or the like. Then, the authentication controller 64 executes authentication on the user based on, for example, information related to the user and stored in the storage unit 5 and the authentication information read by the authentication unit 82.

When the notification signal XH is output from the power supply unit 9, the ink jet printer 1 executes the stop process.

When the stop process is executed, the stop controller 65 generates, based on the notification signal XH output from the power supply unit 9, the stop signal XT for controlling the power supply unit 9 to stop the supply of power PW from the power supply unit 9. Then, the power supply unit 9 stops the supply of power PW based on the stop signal XT.

The power supply unit 9 includes a substrate 900 (refer to FIG. 6), a voltage converting circuit 91, a smoothing circuit 92, a temperature detecting circuit 93, and a notifying circuit 94. The voltage converting circuit 91, the smoothing circuit 92, the temperature detecting circuit 93, and the notifying circuit 94 are mounted on the substrate 900.

The voltage converting circuit 91 transforms an alternating voltage supplied from the commercial alternating power supply (an example of an "alternating power supply") and outputs the alternating voltage after the transformation to the smoothing circuit 92. The smoothing circuit 92 smooths the alternating voltage output from the voltage converting circuit 91 to convert the alternating voltage to a direct-current voltage. The temperature detecting circuit 93 includes a thermistor TM for detecting the temperature of the power supply unit 9 and outputs a detection signal XS indicating the result of the detection by the thermistor TM.

The notifying circuit 94 outputs the notification signal XH if the temperature indicated in the detection signal XS is equal to or higher than a predetermined temperature. For example, the notifying circuit 94 may compare an electrical signal such as a current value or voltage value output from the thermistor TM with another electrical signal serving as a standard signal and change the output based on the magnitude relationship between the two signals. Specifically, as the notifying circuit 94, a comparator may be used, for example.

FIG. 2 is a partial cross-sectional view exemplifying a schematic inner configuration of the ink jet printer 1. As shown in FIG. 2, the embodiment assumes that the ink jet printer 1 includes four ink cartridges 40. FIG. 2 exemplifies the case where the ink cartridges 40 are included in the printing unit 3, but the ink cartridges 40 may be located at other positions in the ink jet printer 1.

The four ink cartridges 40 are provided for four colors, cyan, magenta, yellow, and black (CMYK), respectively. Ink of the colors corresponding to the ink cartridges 40 is filled in the ink cartridges 40.

As shown in FIG. 2, the transporting unit 7 includes a transport motor 70 serving as a driving source for transporting the recording paper P, a motor driving circuit 71 for driving the transport motor 70, a platen 74 installed on the lower side (negative direction on a Z axis in FIG. 2) of the printing unit 3, transport rollers 73 that rotate based on an operation of the transport motor 70, guide rollers 75 rotatably arranged around a Y axis shown in FIG. 2, and a storage section 76 for storing the recording paper P wound in a rolled state.

When the ink jet printer 1 executes the printing process, the transporting unit 7 transports the recording paper P from the storage section 76 toward a positive direction (which is from an upstream side to a downstream side and hereinafter referred to as "transport direction My" in some cases) on an X axis in FIG. 2 along a transport path defined by the guide rollers 75, the platen 74, and the transport rollers 73. Hereinafter, as shown in FIG. 2, the positive direction (transport direction My) on the X axis, and a negative direction on the X axis that is opposite to the positive direction on the X axis, are collectively referred to as X axis direction; a positive direction (upward direction) on the Z axis, and a negative direction (downward direction) on the Z axis that is opposite to the positive direction on the Z axis, are collectively referred to as Z axis direction; and a positive direction on the Y axis that intersects the X axis direction and the Z axis direction, and a negative direction on the Y axis that is opposite to the positive direction on the Y axis, are collectively referred to as Y axis direction.

FIG. 2 exemplifies the case where the recording paper P is continuous roll paper, but the recording paper P may be replaced with one or more rectangular sheets P of, for example, an A4 size or the like. In this case, the transporting unit 7 may operate to intermittently feed the recording sheets P to the platen 74 one by one.

Each of the number 4×M of discharging sections D included in the printing unit 3 receives ink from any of the four ink cartridges 40. The discharging sections D can hold therein ink supplied from the ink cartridges 40 and discharge the ink from nozzles N (refer to FIG. 3) included in the discharging sections D. Specifically, the discharging sections D discharge the ink onto the recording paper P and form dots making up an image on the recording paper P when the transporting unit 7 transports the recording paper P to the platen 74. Full-color printing is achieved by discharging the ink of the four colors CMYK onto an entire printing region from the number 4×M of discharging sections D of the four printing modules HM included in the printing unit 3.

2. Overview of Printing Modules and Discharging Sections

The print heads 30 and the discharging sections D included in the printing heads 30 are described with reference to FIGS. 3 and 4.

Figure 3:
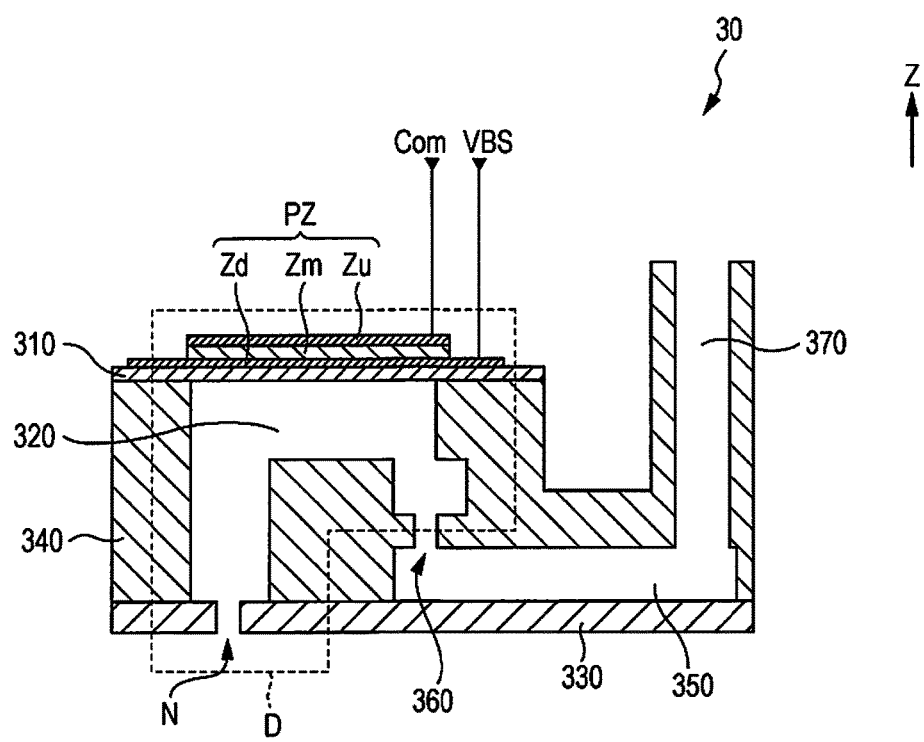
FIG. 3 is a diagram describing an example of the structure of each of discharging sections.

FIG. 3 is a schematic partial cross-sectional view of a print head 30 drawn in such a manner that the print head 30 includes discharging sections D.

As shown in FIG. 3, each of the discharging sections D includes a piezoelectric element PZ, a cavity 320 in which ink is filled, a nozzle N communicating with the cavity 320, and a vibrating plate 310.

The cavity 320 is a space sectioned by a cavity plate 340, a nozzle plate 330 in which the nozzle N is formed, and the vibrating plate 310. The cavity 320 communicates with a reservoir 350 via an ink supply port 360. The reservoir 350 communicates with an ink cartridge 40 corresponding to the target discharging section D via an ink intake port 370.

The piezoelectric element PZ includes an upper electrode Zu, a lower electrode Zd, and a piezoelectric body Zm located between the upper electrode Zu and the lower electrode Zd. When a voltage is applied between the upper electrode Zu and the lower electrode Zd by electrically connecting the lower electrode Zd to a power supply line LHd set to a potential VBS and supplying a driving signal Com to the upper electrode Zu, the piezoelectric element PZ is displaced in the positive direction on the Z axis or the negative direction on the Z axis based on the applied voltage. In the embodiment, as the piezoelectric element PZ, a unimorph (monomorph) piezoelectric element is used as shown in FIG. 3. The piezoelectric element PZ is not limited to the unimorph piezoelectric element and may be a bimorph piezoelectric element, a multilayer piezoelectric element, or the like.

The vibrating plate 310 is installed on an upper opening portion of the cavity plate 340. The lower electrode Zd is bonded to the vibrating plate 310. Thus, when the piezoelectric element PZ is driven and displaced by the driving signal Com, the vibrating plate 310 is also displaced. Then, the capacity of the cavity 320 changes due to the displacement of the vibrating plate 310 and the ink filled in the cavity 320 is discharged from the nozzle N. When the amount of the ink within the cavity 320 is reduced due to the discharge of the ink, ink is supplied from the reservoir 350 into the cavity 320.

Figure 4:
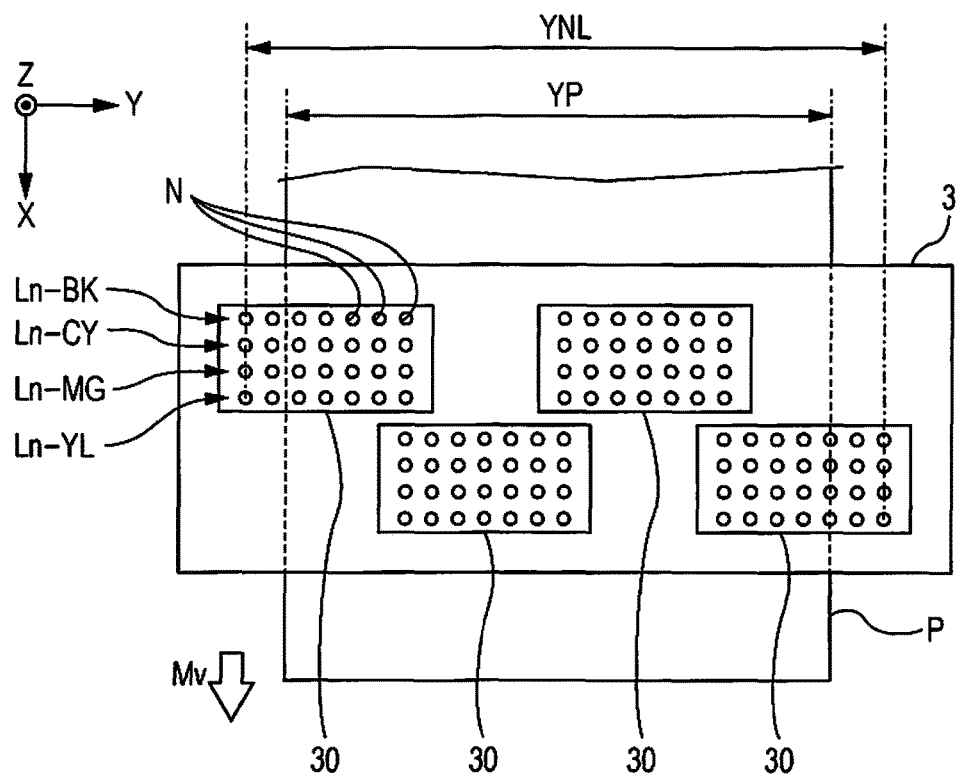
FIG. 4 is a plan view showing an example of the arrangement of nozzles of a printing unit.

FIG. 4 is a diagram describing an example of the arrangement of the four print heads 30 included in the printing unit 3 and the number 4×M of nozzles N included in the four print heads 30 when the ink jet printer 1 is viewed in plan view from the positive direction on the Z axis.

As shown in FIG. 4, each of the print heads 30 included in the printing unit 3 includes nozzle strings Ln. Each of the nozzle strings includes multiple nozzles N arranged in a predetermined direction. The embodiment assumes that each of the print heads 30 includes four nozzle strings, a nozzle string Ln-Bk, a nozzle string Ln-CY, a nozzle string Ln-MG, and a nozzle string Ln-YL as an example. Nozzles N that belong to the nozzle strings Ln-BK are included in discharging sections D for discharging black ink. Nozzles N that belong to the nozzle strings Ln-CY are included in discharging sections D for discharging cyan ink. Nozzles N that belong to the nozzle strings Ln-MG are included in discharging sections D for discharging magenta ink. Nozzles N that belong to the nozzle strings Ln-YL are included in discharging sections D for discharging yellow ink. In addition, the embodiment assumes that four nozzle strings included in each of the print heads 30 extend in the Y axis direction when viewed in plan view as an example.

As shown in FIG. 4, the printing unit 3 according to the embodiment is a so-called line head. Specifically, when the ink jet printer 1 executes the printing process on the recording paper P (specifically, recording paper P having a width extending in the Y axis direction and equal to the maximum width printable by the ink jet printer 1), an arrangement range YNL of the number 4×M of nozzles N included in the printing unit 3 in the Y axis direction includes a range YP of the recording paper P in the Y axis direction.

The embodiment assumes that the range YP is equal to or larger than 297 millimeters as an example. In other words, the line head (printing unit 3) included in the ink jet printer 1 according to the embodiment has a size in the Y axis direction in such a manner that the line head (printing unit 3) executes printing on an A4 size recording sheet P having longer sides extending in the Y axis direction. In the embodiment, the nozzles N are arranged in the printing unit 3 in such a manner that the printing unit 3 can form dots at densities of 2400 dpi or more×600 dpi or more. In the embodiment, the ink jet printer 1 can execute the printing process at a certain printing speed to form 20 or more images of the A4 size per minute.

The arrangement, shown in FIG. 4, of the four print heads 30 included in the printing unit 3 and the arrangement, shown in FIG. 4, of the nozzle strings Ln of the print heads 30 are examples. In the printing unit 3, the arrangement of the print heads 30 and the arrangement of the nozzle strings Ln are arbitrary.

For example, although the nozzle strings Ln extend in the Y axis direction in FIG. 4, the nozzle strings Ln may extend in an arbitrary direction in an XY plane. The nozzle strings Ln may extend in an oblique direction different from the X and Y axis directions in the XY plane.

In addition, although each of the print heads 30 includes four nozzle strings Ln in FIG. 4, it is sufficient if each of the print heads 30 includes one or more nozzle strings Ln.

Furthermore, multiple nozzles N included in each of the nozzle strings Ln are arranged in a single row in the Y axis direction in FIG. 4, but may be arranged in a so-called zigzag manner in such a manner that the positions, in the X axis direction, of even-numbered nozzles N from the negative direction on the Y axis are different from the positions, in the X axis direction, of odd-numbered nozzles from the negative direction on the Y axis in FIG. 4.

3. Power Supply Unit

The power supply unit 9 is described with reference to FIGS. 5 to 7.

Figure 5:
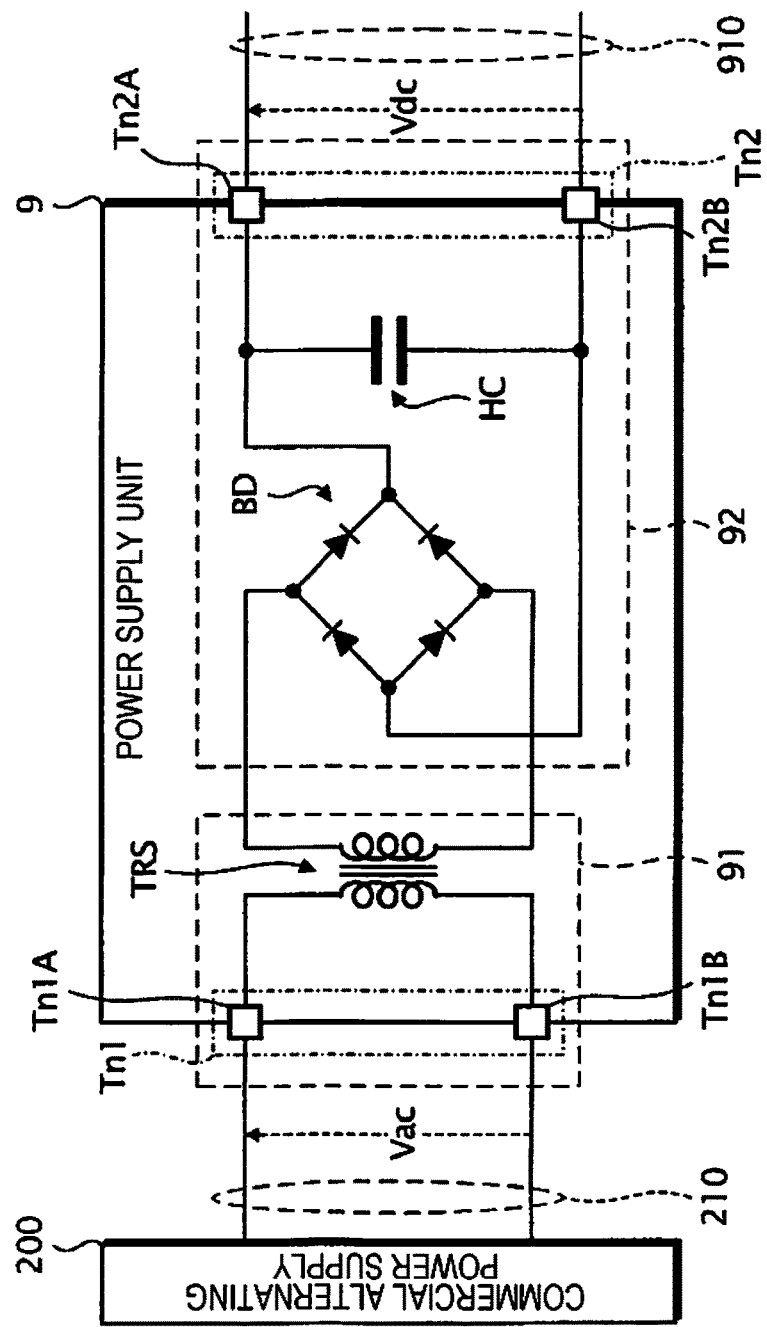
FIG. 5 is a circuit diagram showing an example of the structure of a power supply unit.

FIG. 5 is a circuit diagram schematically showing configurations of the voltage converting circuit 91 and smoothing circuit 92 of the power supply unit 9.

As shown in FIG. 5, the voltage converting circuit 91 includes an input terminal Tn1 and a transformer TRS.

The input terminal Tn1 includes terminals Tn1A and Tn1B capable of being electrically connected to a power cable 210. An alternating voltage Vac is input to the input terminal Tn1 from the commercial alternating power supply 200 via the power cable 210. The transformer TRS transforms the alternating voltage Vac input to the input terminal Tn1 and outputs the alternating voltage after the transformation to the smoothing circuit 92.

As shown in FIG. 5, the smoothing circuit 92 includes a rectifying circuit BD, a smoothing capacitor HC, and an output terminal Tn2.

The rectifying circuit BD is, for example, a bridge diode including multiple diodes and rectifies the alternating voltage input from the voltage converting circuit 91. The smoothing capacitor HC smooths the voltage rectified by the rectifying circuit BD to convert the voltage to a direct-current voltage Vdc and supplies the direct-current voltage Vdc to the output terminal Tn2. The output terminal Tn2 includes terminals Tn2A and Tn2B connected to an internal wiring 910. The terminal Tn2B is set to a low power supply potential VBS, while the terminal Tn2A is set to a high power supply potential VHV that is higher by a potential Vdc than the potential VBS.

FIG. 6 is a diagram describing the arrangement of various circuits and the like that are included in the power supply unit 9. Although FIG. 6 exemplifies the case where a normal direction of the substrate 900 is parallel to the Z axis direction, the invention is not limited to this. The orientation of the substrate 900 is arbitrary.

As shown in FIG. 6, the substrate 900 has a side Q1 (an example of a "first side") in which the input terminal Tn1 is installed and a side Q2 (an example of a "second side") in which the output terminal Tn2 is installed. In addition, the side Q1 of the substrate 900 is closest to an opening 1001 of the housing 1000 among four sides of the substrate 900. The input terminal Tn1 is connected to the power cable 210 via the opening 1001.

Furthermore, the three sides of the substrate 900 that exclude the side Q1 are covered by the housing 1000.

As shown in FIG. 6, the smoothing capacitor HC, the thermistor TM, the rectifying circuit BD, and the output terminal Tn2 are mounted in this order from the side of the input terminal Tn1 in a straight line extending in a direction W on the substrate 900. Specifically, the smoothing capacitor HC is located between the thermistor TM and the input terminal Tn1, while the rectifying circuit BD is located between the thermistor TM and the output terminal Tn2.

The arrangement shown in FIG. 6 is an example. A part or all of the smoothing capacitor HC, the thermistor TM, and the rectifying circuit BD may not overlap the straight line that connects the input terminal Tn1 and the output terminal Tn2 to each other. In addition, although FIG. 6 exemplifies the case where the direction W extending from the input terminal Tn1 to the output terminal Tn2 is parallel to the positive direction on the X axis, the invention is not limited to this. The direction W may be an arbitrary direction.

As shown in FIG. 6, a gap between the input terminal Tn1 and the smoothing capacitor HC is referred to as gap W1, a gap between the input terminal Tn1 and the thermistor TM is referred to as gap W2, a gap between the input terminal Tn1 and the rectifying circuit BD is referred to as gap w3, a gap between the thermistor TM and the smoothing capacitor HC is referred to as gap W21, a gap between the thermistor TM and the rectifying circuit BD is referred to as gap W23, and a gap between the thermistor TM and the output terminal Tn2 is referred to as gap W24.

In this case, in the embodiment, the smoothing capacitor HC, the thermistor TM, and the rectifying circuit BD are arranged in such a manner that relationships indicated by the following Inequalities (1) to (4) are established.

$$W1 < W2 \tag{1}$$

$$W2 < W3 \tag{2}$$

$$W24 < W2 \tag{3}$$

$$W21 < W23 \tag{4}$$

Specifically, in the embodiment, as indicated by Inequality (1), the gap W2 between the input terminal Tn1 and the thermistor TM is longer than the gap W1 between the input terminal Tn1 and the smoothing capacitor HC. In other words, in the embodiment, the smoothing capacitor HC is located between the thermistor TM and the input terminal Tn1.

In addition, in the embodiment, as indicated by Inequality (2), the gap W3 between the input terminal Tn1 and the rectifying circuit BD is longer than the gap W2 between the input terminal Tn1 and the thermistor TM.

In addition, in the embodiment, as indicated by Inequality (3), the gap W2 between the thermistor TM and the input terminal Tn1 is longer than the gap W24 between the thermistor TM and the output terminal Tn2. In other words, a gap between the thermistor TM and the side Q1 is longer than a gap between the thermistor TM and the side Q2.

In addition, in the embodiment, as indicated by Inequality (4), the gap W23 between the thermistor TM and the rectifying circuit BD is longer than the gap W21 between the thermistor TM and the smoothing capacitor HC.

Next, temperatures at positions within the power supply unit 9 are described with reference to FIGS. 6 and 7.

Figure 7:
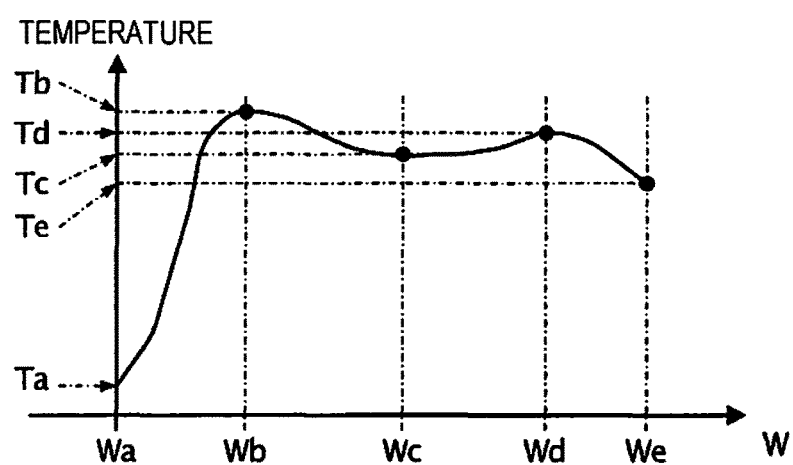
FIG. 7 is a diagram describing an example of a temperature distribution of the power supply unit.

FIG. 7 is a conceptual diagram showing an example of changes in the temperatures of the positions on a virtual line (or a virtual polygonal line) connecting, to each other, the constituent elements that are included in the power supply unit 9 and are the input terminal Tn1, the smoothing capacitor HC, the thermistor TM, the rectifying circuit BD, and the output terminal Tn1. As shown in FIG. 7, when power PW is supplied to the power supply unit 9, the temperature Ta of the input terminal Tn1 located at a position Wa on the virtual line, the temperature Tb of the smoothing capacitor HC located at a position Wb on the virtual line, the temperature Tc of the thermistor TM located at a position Wc on the virtual line, the temperature Td of the rectifying circuit BD located at a position Wd on the virtual line, and the temperature Te of the output terminal Tn2 located at a position We on the virtual line indicate relationships indicated by the following Inequalities (5).

$$Ta<Te<Tc<Td<Tb \quad (5)$$

Variations in the temperatures shown in FIG. 7 are an example. When the power supply unit 9 supplies power PW, it is at least expected that the temperatures Tb and Td are higher than the temperatures Ta and Te, the temperature Tb is higher than the temperature Tc, and the temperature Tc is higher than the temperatures Ta and Te.

In general, when the power supply unit 9 supplies power PW, it is likely that the temperature of the smoothing capacitor HC and the temperature of the rectifying circuit BD are higher than the temperatures of the other constituent elements of the power supply unit 9. Even when the power supply unit 9 supplies power PW, the input terminal Tn1 is exposed to air outside the housing 1000, and the temperature of the input terminal Tn1 is likely to be lower than the other constituent elements of the power supply unit 9.

Thus, as described in the embodiment, in the case where the thermistor TM is closer to the output terminal Tn2 than the smoothing capacitor HC, when the temperature of the smoothing capacitor HC or the temperature of the rectifying circuit BD increases, the increase in the temperature can be quickly detected, compared with the case where the thermistor TM is closer to the input terminal Tn1 than the smoothing capacitor HC. Thus, according to the embodiment, it is possible to suppress a state in which the temperature of the smoothing capacitor HC or the temperature of the rectifying circuit BD continues to be high.

4. Configuration of Printing Unit

Configurations of the printing modules HM are described with reference to FIG. 8.

Figure 8:
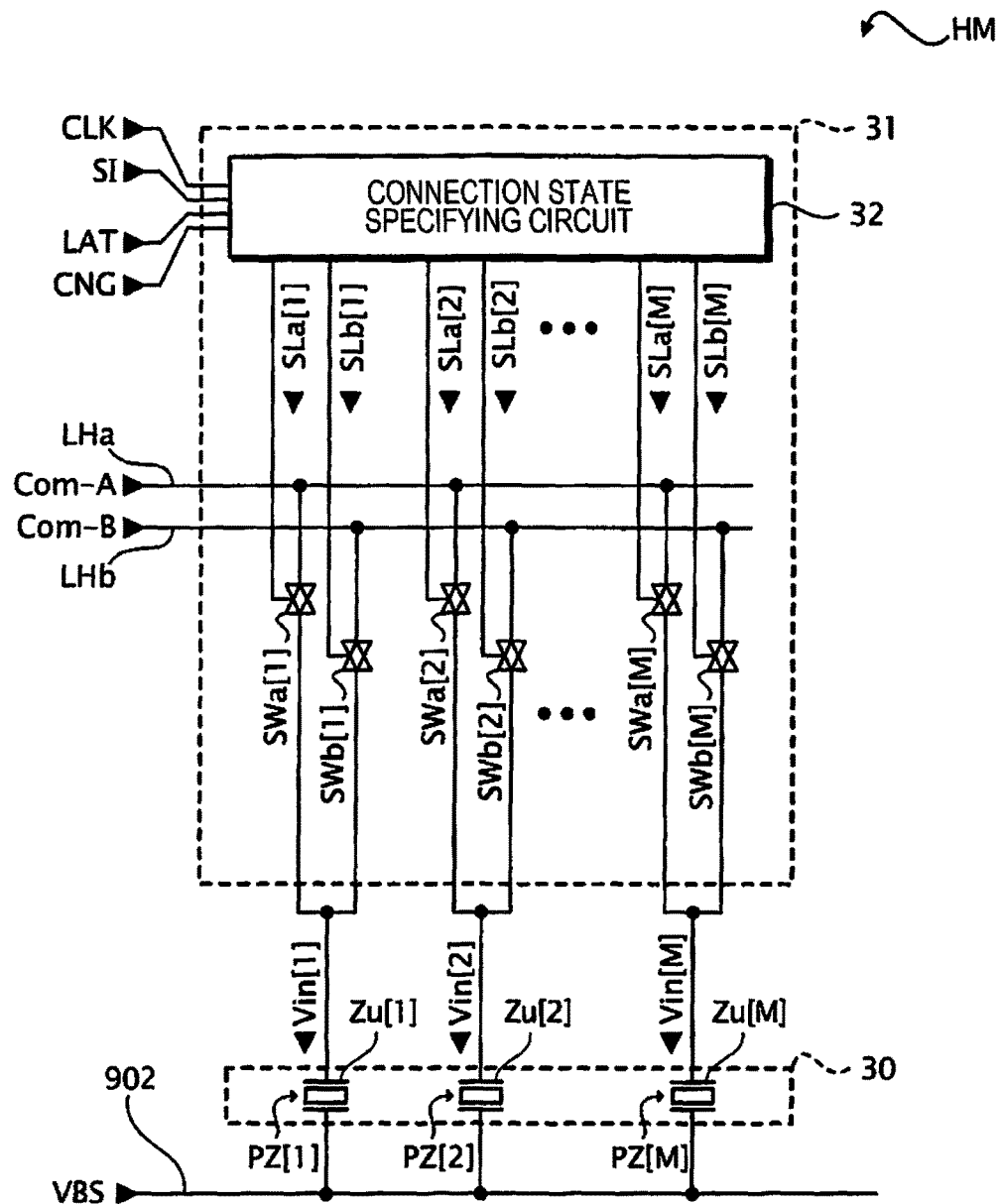
FIG. 8 is a block diagram showing an example of the configuration of each of printing modules.

FIG. 8 is a block diagram showing an example of the configuration of each of the printing modules HM. As described above, each of the printing modules HM includes a print head 30 and a driving signal supply circuit 31. Each of the printing modules HM also includes an internal wiring LHa through which a driving signal Com-A is supplied from the driving signal generating unit 2 and an internal wiring LHb through which a driving signal Com-B is supplied from the driving signal generating unit 2. In addition, a power supply line 902 electrically connected to the terminal Tn2B and set to a potential VBS is connected to the printing modules HM.

As shown in FIG. 8, each of the driving signal supply circuits 31 includes a number M of switches SWa (SWa[1] to SWa[M]), a number M of switches SWb (SWb[1] to SWb[M]), and a connection state specifying circuit 32 that specifies connection states of the switches. As the switches, transmission gates may be used, for example.

The connection state specifying circuit 32 generates, based on a printing signal SI, a latch signal AT, and a change signal CNG that have been supplied from the print controller 61, connection state specifying signals SLa[1] to SLa[M] for specifying on and off states of the switches SWa[l] to SWa[M] and connection state specifying signals SLb[1] to SLb[M] for specifying on and off states of the switches SWb[l] to SWb[M].

A switch SWa[m] switches, based on a connection state specifying signal SLa[m], conduction and non-conduction between an internal wiring LHa and an upper electrode Zu of [m] of a piezoelectric element PZ[m] included in a discharging section D[m]. As an example, the embodiment assumes that the switch SWa[m] is turned on when the connection state specifying signal SLa[m] is at a high level and that the switch SWa[m] is turned off when the connection state specifying signal SLa[m] is at a low level.

A switch SWb[m] switches, based on a connection state specifying signal SLb[m], conduction and non-conduction between an internal wiring LHb and an upper electrode Zu of [m] of a piezoelectric element PZ[m] included in a discharging section D[m]. As an example, the embodiment assumes that the switch SWb[m] is turned on when the connection state specifying signal SLb[m] is at a high level and that the switch SWb[m] is turned off when the connection state specifying signal SLb[m] is at a low level.

A signal that is either a driving signal Com-A or a driving signal Com-B and is supplied to a piezoelectric element PZ[m] of a discharging section D[m] via a switch SWa[m] or a switch SWb[m] is referred to as supply driving signal Vin[m] in some cases.

5. Operations of Printing Unit

Operations of the printing modules HM are described with reference to FIGS. 9 to 11.

In the embodiment, an operational time period of the ink jet printer 1 includes one or multiple unit time periods Tu. The ink jet printer 1 can execute the printing process within each of the unit time periods Tu. Specifically, the ink jet printer 1 can execute a process of driving the discharging sections D and causing the discharging sections D to discharge ink in the printing process within each of the unit time periods Tu. The ink jet printer 1 forms the image indicated in the printing data Img by repeatedly executing the printing process within continuous or intermittent multiple unit time periods Tu and causing each of the discharging sections D to discharge ink one or multiple times, for example.

Figures 9, 10:
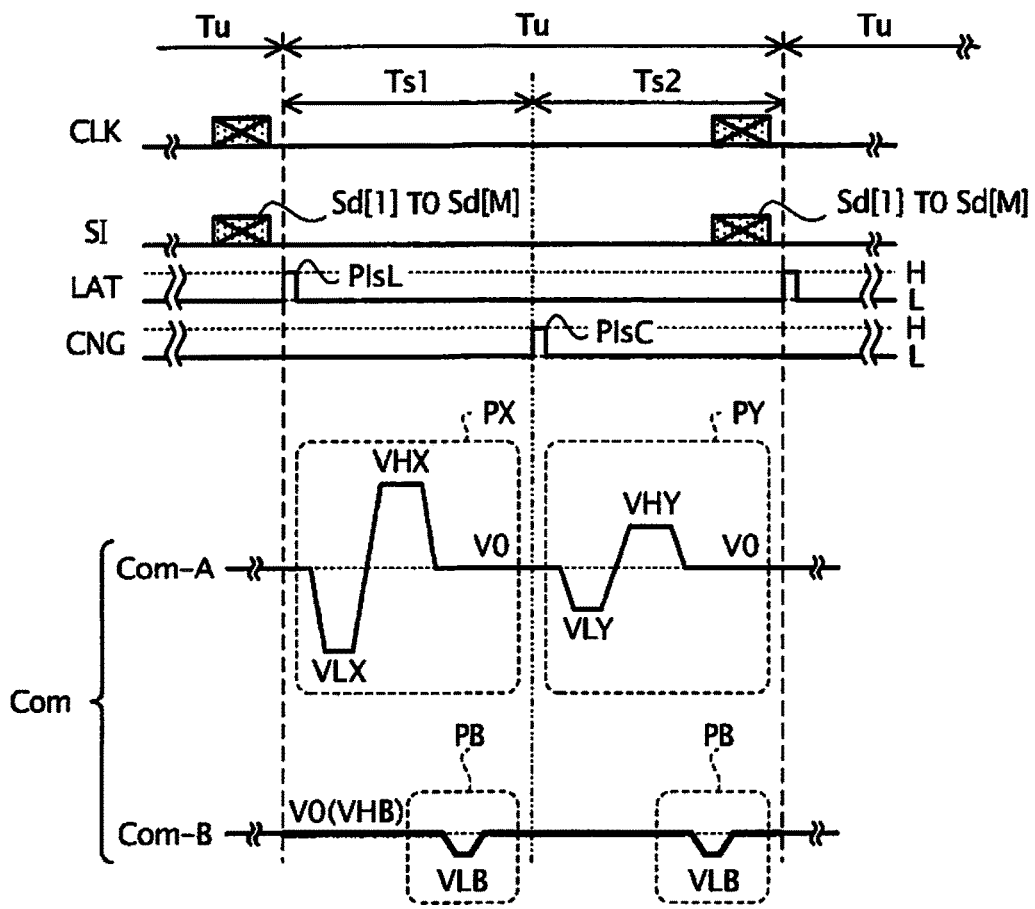
FIG. 9 is a timing chart of an example of a printing process.
FIG. 10 is a diagram describing an example of relationships between a printing signal and connection state specifying signals.

FIG. 9 is a timing chart of an example of operations of the ink jet printer 1 in a unit time period Tu.

As shown in FIG. 9, the print controller 61 outputs the latch signal LAT having a pulse PlsL and the change signal CNG having a pulse PlsC. Thus, the print controller 61 defines each of the unit time periods Tu as a time period from a rise of the pulse PlsL to the next rise of the pulse PlsL. In addition, the print controller 61 divides each of the unit time periods Tu into two control time periods Ts1 and Ts2 based on the pulse PlsC.

A printing signal SI includes individual specifying signals Sd[1] to Sd[M] specifying driving states of the discharging sections D[1] to D[M] in each of the unit time periods Tu. As shown in FIG. 9, when the printing process is executed within the target unit time period Tu, the print controller 61 synchronizes the printing signal SI including the individual specifying signals Sd[1] to Sd[M] with a clock signal CLK and supplies the printing signal SI and the clock signal CLK to a connection state specifying circuit 32 before the start of the target unit time period. In this case, the connection state specifying circuit 32 generates connection state specifying signals SLa[m] and SLb[m] based on an individual specifying signal Sd[m] within the target unit time period Tu.

As shown in FIG. 9, a driving signal generating circuit 20 outputs a driving signal Com-A having a waveform PX in a control time period Ts1 and a waveform PY in a control time period Ts2. In the embodiment, the waveforms PX and PY are determined in such a manner that the difference between the highest potential VHX of the waveform PX and the lowest potential VLX of the waveform PX is larger than the difference between the highest potential VHY of the waveform PY and the lowest potential VLY of the waveform PY. Specifically, in the case where the discharging section D[m] is driven by the driving signal Com-A having the waveform PX, the waveform PX is determined in such a manner that ink in an amount (middle amount) corresponding to a middle dot is discharged from the discharging section D[m]. In the case where the discharging section D[m] is driven by the driving signal Com-A having the waveform PY, the waveform PY is determined in such a manner that ink in an amount (small amount) corresponding to a small dot is discharged from the discharging section D[m]. Potentials of the waveforms PX and PY upon the start and end of the unit time period Tu are set to a standard potential V0.

In addition, the driving signal generating circuit 20 outputs a driving signal Com-B having two waveforms PB in the control time periods Ts1 and Ts2. In the embodiment, the waveforms PB are determined in such a manner that the difference between the highest potential VHB of the waveforms PB and the lowest potential VLB of the waveforms PB is smaller than the difference between the highest potential VHY of the waveform PY and the lowest potential VLY of the waveform PY. Specifically, in the case where the discharging section D[m] is driven by the driving signal Com-B having the waveforms PB, the waveforms PB are determined in such a manner that the discharging section D[m] is driven and does not discharge ink. Potentials of the waveforms PB upon the start and end of the unit time period Tu are set to the standard potential V0. The embodiment assumes that the highest potential VHB is equal to the standard potential V0.

FIG. 10 is a diagram describing an example of relationships between the individual specifying signal Sd[m] and the connection state specifying signals SLa[m] and SLb[m] in the unit time period Tu.

As shown in FIG. 10, the embodiment assumes that the individual specifying signal Sd[m] is a 2-bit digital signal. Specifically, in each of the unit time periods Tu, the individual specifying signal Sd[m] is set to any of a value (1, 1) specifying the discharge (hereinafter also referred to as "large dot formation") of ink in an amount (large amount) corresponding to a large dot for the discharging section D[m], a value (1, 0) specifying the discharge (hereinafter also referred to as "middle dot formation") of ink in an amount (middle amount) corresponding to a middle dot for the discharging section D[m], a value (0, 1) specifying the discharge (hereinafter also referred to as "small dot formation") of ink in an amount (small amount) corresponding to a small dot for the discharging section D[m], and a value (0, 0) specifying non-discharge of ink for the discharging section D[m].

If the individual specifying signal Sd[m] is set to the value (1, 1) specifying the large dot formation, the connection state specifying circuit 32 sets the connection state specifying signal SLa(m) to the high level in the control time periods Ts1 and Ts2 and sets the connection state specifying signal SLb(m) to the low level in the control time periods Ts1 and Ts2. In this case, the discharging section D[m] is driven by the driving signal Com-A having the waveform PX to discharge a middle amount of ink in the control time period Ts1 and is driven by the driving signal Com-A having the waveform PY to discharge a small amount of ink in the control time period Ts2. Thus, the discharging section D[m] totally discharges a large amount of ink in the unit time period Tu and forms a large dot on the recording paper P.

If the individual specifying signal Sd[m] is set to the value (1.0) specifying the middle dot formation, the connection state specifying circuit 32 sets the connection state specifying signal SLa(m) to the high level in the control time period Ts1 and to the low level in the control time period Ts2 and sets the connection state specifying signal SLb(m) to the low level in the control time period Ts1 and to the high level in the control time period Ts2. In this case, the discharging section D[m] totally discharges a middle amount of ink in the unit time period Tu and forms a middle dot on the recording paper P.

If the individual specifying signal Sd[m] is set to the value (0.1) specifying the small dot formation, the connection state specifying circuit 32 sets the connection state specifying signal SLa(m) to the low level in the control time period Ts1 and to the high level in the control time period Ts2 and sets the connection state specifying signal SLb(m) to the high level in the control time period Ts1 and to the low level in the control time period Ts2. In this case, the discharging section D[m] totally discharges a small amount of ink in the unit time period Tu and forms a small dot on the recording paper P.

If the individual specifying signal Sd[m] is set to the value (0.0) specifying the non-discharge of ink, the connection state specifying circuit 32 sets the connection state specifying signal SLa[m] to the low level in the control time periods Ts1 and Ts2 and sets the connection state specifying signal SLb[m] to the high level in the control time periods Ts1 and Ts2. In this case, the discharging section D[m] does not discharge ink in the unit time period Tu and does not form a dot on the recording paper P.

Figure 11:
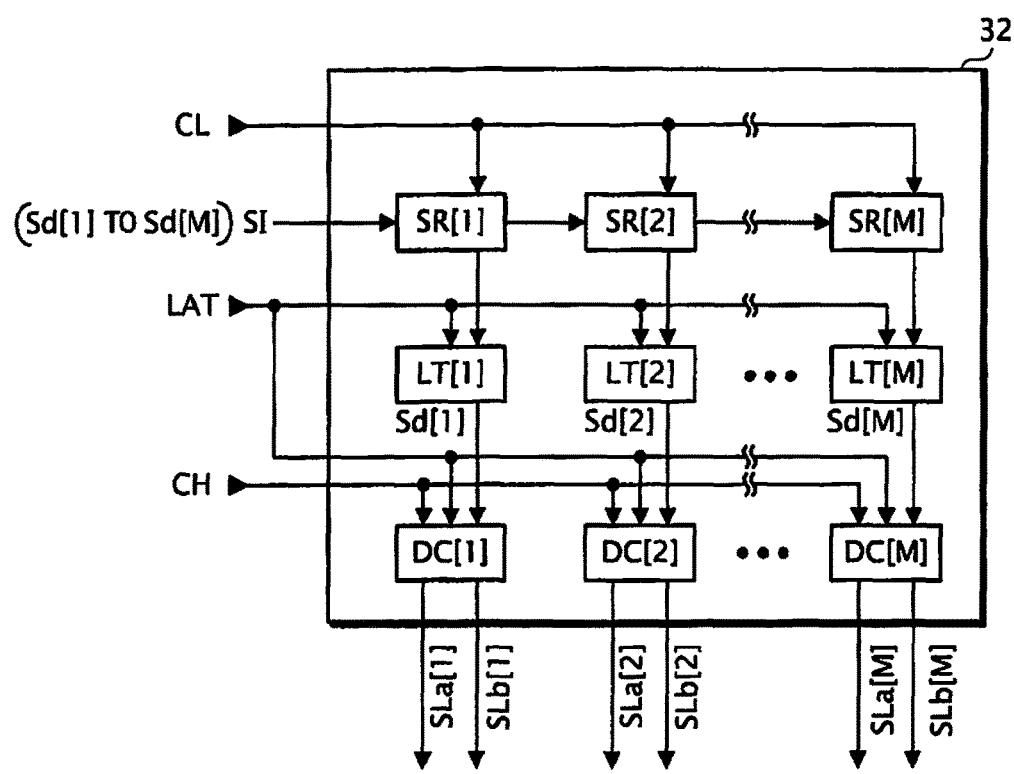
FIG. 11 is a block diagram showing an example of the configuration of each of driving signal supply circuits.

FIG. 11 is a diagram showing an example of the configuration of each of the connection state specifying circuits 32 according to the embodiment. As shown in FIG. 11, the connection state specifying circuit 32 generates connection state specifying signals SLa[1] to SLa[M] and connection state specifying signals SLb[1] to SLb[M].

Specifically, the connection state specifying circuit 32 includes transferring circuits SR[1] to SR[M], latch circuits LT[1] to LT[M], and decoders DC[1] to DC[M]. The transferring circuits SR[1] to SR[M] correspond to the discharging sections D[1] to D[M], respectively. The latch circuits LT[1] to LT[M] correspond to the discharging sections D[1] to D[M], respectively. The decoders DC[1] to DC[M] correspond to the discharging sections D[1] to D[M], respectively. An individual specifying signal Sd[m] is supplied to a transferring circuit SR[m] among the transferring circuits SR[1] to SR[M]. FIG. 11 exemplifies the case where the individual specifying signals Sd[l] to Sd[M] are serially supplied. For example, FIG. 11 exemplifies the case where the individual specifying signal Sd[m] corresponding to an m-th stage is transferred from the transferring circuit SR[1] to the transferring circuit SR[m] while being synchronized with the clock signal CLK. In addition, a latch circuit LT[m] latches the individual specifying signal Sd[m] supplied to the transferring circuit SR[m] when the pulse PlsL of the latch signal LAT rises to a high level. Furthermore, a decoder DC[m] generates connection state specifying signals SLa[m] and SLb[m] based on the individual specifying signal Sd[m], the latch signal LAT, and the change signal CH in accordance with relationships shown in FIG. 10.

6. Conclusion of Embodiment

When the power supply unit 9 supplies power PW, heat is generated from the smoothing capacitor HC, the rectifying circuit BD, and the like. The heat generated from the smoothing capacitor HC, the rectifying circuit BD, and the like is released from the input terminal Tn1 to the outside of the ink jet printer 1. Thus, a heat release efficiency of a certain portion of the power supply unit 9 is reduced as a gap between the input terminal Tn1 and the certain portion is increased. Specifically, a heat release efficiency on the side of the output terminal Tn2 with respect to the smoothing capacitor HC is lower than a heat release efficiency on the side of the input terminal Tn1 with respect to the smoothing capacitor HC. Especially, if the ink jet printer 1 and the power supply unit 9 are downsized, the heat release efficiency on the side of the output terminal Tn2 with respect to the smoothing capacitor HC is reduced, compared with the case where the power supply unit 1 is large in size.

The amount of power consumed by the multifunctional ink jet printer 1 having the multiple functions easily increases and the temperature of the power supply unit 9 easily increases in the embodiment, compared with a monofunctional ink jet printer.

In consideration of the aforementioned problems, the thermistor TM is located closer to the output terminal Tn2 than the smoothing capacitor HC in the embodiment. Specifically, in the embodiment, the thermistor TM is located at a position where a heat release efficiency is low in the power supply unit 9. Thus, when the temperature of the smoothing capacitor HC changes to a high temperature, the change in the temperature of the smoothing capacitor HC can be quickly detected, compared with the case where the thermistor TM is located on the side of the input terminal Tn1 with respect to the smoothing capacitor HC. This can reduce a time period during which the temperature of the power supply unit 9 including the smoothing capacitor HC continues to be high and can reduce the probability at which a failure may occur in the power supply unit 9 and the ink jet printer 1 due to a change in the temperature of the power supply unit 9 to a high temperature.

B. Modified Examples

The embodiment may be variously modified. Specific modifications are exemplified as follows. Two or more modified examples arbitrarily selected from among the following modified examples may be combined without contradicting each other. In the following modified examples, elements that exert effects that are the same as or similar to those described in the embodiment and have functions that are the same as or similar to those described in the embodiment are indicated by the same reference symbols as those described above, and a detailed description thereof is omitted.

First Modified Example

In the aforementioned embodiment, the thermistor TM is arranged to establish the relationship indicated by Inequality (4). The invention, however, is not limited to this. The thermistor TM may be arranged to establish the following inequality (6).

$$W21 \geq W23 \tag{6}$$

Second Modified Example

In the aforementioned embodiment and the first modified example, the thermistor TM is arranged to establish Inequalities (1) to (4) or Inequalities (1) to (3) and (6) in the power supply unit 9. The invention, however, is not limited to this. It is sufficient if the thermistor TM is arranged in such a manner that the gap between the thermistor TM and the input terminal Tn1 is 3 cm (an example of a "predetermined length") or more. It is preferable that the thermistor TM be arranged in such a manner that the gap between the thermistor TM and the input terminal Tn1 is 5 cm (another example of the "predetermined length") or more.

Third Modified Example

The aforementioned embodiment and the first and second modified examples assume that the resolution of the ink jet printer 1 is "2400 dpi or more×600 dpi or more". The invention, however, is not limited to this. It is sufficient if the resolution of the ink jet printer 1 is "300 dpi or more×300 dpi or more". It is preferable that the resolution of the ink jet printer 1 be "600 dpi or more×600 dpi or more".

Fourth Modified Example

In the aforementioned embodiment and the first to third modified examples, the ink jet printer 1 can print 20 or more A4-size images per minute. The invention, however, is not limited to this. It is sufficient if the ink jet printer 1 can print 10 or more A4-size images per minute.

Fifth Modified Example

In the aforementioned embodiment and the first to fourth modified examples, the ink jet printer 1 is a line printer. The invention, however, is not limited to this. The ink jet printer 1 may be a so-called serial printer.

In the case where the ink jet printer 1 is a serial printer, it is sufficient if the ink jet printer 1 has a carriage holding the printing unit 3 and the transporting unit 7 causes the carriage to reciprocate in a direction intersecting the transport direction My of the recording paper P during the execution of the printing process.

Sixth Modified Example

In the aforementioned embodiment and the first to fifth modified examples, the print controller 61, the reading controller 62, the communication controller 63, the authentication controller 64, and the stop controller 65, which are included in the control unit 6, are functional blocks achieved by causing the CPU to operate in accordance with the control program. The invention, however, is not limited to this. At least a part of the print controller 61, the reading controller 62, the communication controller 63, the authentication controller 64, and the stop controller 65 may include a portion implemented as a circuit.

Seventh Modified Example

In the aforementioned embodiment and the first to sixth modified examples, the stop controller 65 is a functional block achieved by causing the CPU included in the control unit 6 to operate in accordance with the control program. The invention, however, is not limited to this. The stop controller 65 may be included in the power supply unit 9. In this case, the stop controller 65 may be configured to stop the supply of power from the power supply unit 9 based on the detection signal XS output from the detecting circuit 93 or the notification signal XH output from the notifying circuit 94 (or without the communication of information with the control unit 6).

Eighth Modified Example

In the aforementioned embodiment and the first to seventh modified examples, the ink jet printer 1 has the printing function, the copy function, the scanner function, the facsimile transmission function, the facsimile reception function, the authentication function, and the stop function. The invention, however, is not limited to this. It is sufficient if the ink jet printer 1 has at least a part of the printing function, the stop function, the copy function, the scanner function, the facsimile transmission function, the facsimile reception function, and the authentication function. In addition, the ink jet printer 1 may have a different function from the aforementioned various functions. It is preferable that the ink jet printer 1 correspond to a so-called "multifunctional machine".

Ninth Modified Example

In the aforementioned embodiment and the first to eighth modified examples, the printing unit 3 includes the four printing modules HM. The invention, however, is not limited to this. It is sufficient if the printing unit 3 includes one or more printing modules HM.

In addition, in the aforementioned embodiment and the first to eighth modified examples, the driving signal generating unit 2 includes the driving signal generating circuits 20 that correspond to the printing modules HM, respectively. The invention, however, is not limited to this. The driving signal generating unit 2 may include two or more driving signal generating circuits 20 for each of the printing modules HM or may include a single driving signal generating circuit 20 for every two or more printing modules HM.

Tenth Modified Example

The aforementioned embodiment and the first to ninth modified examples describe, as a printing apparatus, the piezoelectric ink jet printer 1 that discharges ink using the piezoelectric elements PZ. The invention, however, is not limited to this. The printing apparatus may be a printer other than the piezoelectric ink jet printer. For example, the printing apparatus may be a thermal ink jet printer, a thermal transfer ink jet printer, a thermal printer, a laser printer, or a printer of another type.

Eleventh Modified Example

In the aforementioned embodiment and the first to tenth modified examples, the stop process is executed when the notification signal XH is output. The invention, however, is not limited to this. The stop process may be executed based on the state of the notification signal XH. Specifically, the stop process may be executed based on the level (or a change in the level of the notification signal XH) of the notification signal XH or an output state (or a change in the output state) of the notification signal XH. For example, the stop process may be executed when the output of the notification signal XH is stopped. In addition, for example, the stop process may be executed when the potential of the notification signal XH becomes equal to a predetermined potential.

What is claimed is:

1. A printing apparatus that has a plurality of functions including a printing function of forming an image on a medium and is capable of executing printing with resolution of 300 dpi or more, comprising:
a plurality of operating units including a printing unit that forms an image on a medium; and
a power supply unit that supplies power to the plurality of operating units,
wherein the power supply unit includes
a substrate,
an input terminal that receives an alternating voltage from a power cable electrically connected to an alternating power supply,
a smoothing capacitor that smooths the alternating voltage input from the input terminal,
a thermistor that detects a temperature, and
a comparator that compares a signal output from the thermistor with a standard signal and outputs a notification signal,
wherein the input terminal, the smoothing capacitor, the thermistor, and the comparator are mounted on the substrate,
wherein the supply of power from the power supply unit is stopped based on the state of the notification signal, and wherein a gap between the input terminal and the thermistor is longer than a gap between the input terminal and the smoothing capacitor.

2. The printing apparatus according to claim 1, wherein the gap between the input terminal and the thermistor is 3 cm or more.

3. The printing apparatus according to claim 1,
wherein the smoothing capacitor is located between the thermistor and the input terminal.

4. The printing apparatus according to claim 1,
wherein the substrate has a first side and a second side opposite to the first side when the substrate is viewed in plan view,
wherein the input terminal is located closer to the first side of the substrate than to the second side of the substrate, and
wherein the thermistor is located closer to the second side of the substrate than to the first side of the substrate.

5. The printing apparatus according to claim 4, further comprising
a housing covering sides that are among a plurality of sides of the substrate and exclude the first side when the substrate is viewed in plan view.

6. The printing apparatus according to claim 1,
wherein the plurality of functions includes at least a part or all of a copy function of copying an image printed on a medium, a reading function of reading an image printed on a medium, an image information transmission function of transmitting information indicating an image printed on a medium to an external device, and an image information reception function of forming an image on a medium based on information received from an external device and indicating the image.

7. The printing apparatus according to claim 1, further comprising
a rectifying circuit that rectifies alternating voltage input from the input terminal before input the smoothing capacitor, and
an output terminal that outputs voltage smoothed by the smoothing capacitor,
wherein the rectifying circuit and the output terminal are mounted on the substrate, and
wherein a gap between the output terminal and the thermistor is longer than a gap between the output terminal and the rectifying circuit.

8. The printing apparatus according to claim 7,
wherein the rectifying circuit is located between the thermistor and the output terminal.

9. The printing apparatus according to claim 7,
wherein the thermistor is located between the rectifying circuit and the smoothing capacitor.

10. The printing apparatus according to claim 9,
wherein a gap between the rectifying circuit and the thermistor is shorter than a gap between the smoothing capacitor and the thermistor.

11. The printing apparatus according to claim 1,
wherein, in a case where the power supply unit supplies power to the printing apparatus, a temperature of the smoothing capacitor is higher than a temperature of the input terminal.

12. A power supply unit for a printing apparatus that has a plurality of functions including a printing function of forming an image on a medium and is capable of executing printing with resolution of 300 dpi or more, comprising:
a substrate;
an input terminal that receives an alternating voltage from a power cable electrically connected to an alternating power supply;
a smoothing capacitor that smooths the alternating voltage input from the input terminal; and
a thermistor that detects a temperature,
wherein the input terminal, the smoothing capacitor, and the thermistor are mounted on the substrate, and
wherein a gap between the input terminal and the thermistor is longer than a gap between the input terminal and the smoothing capacitor.

13. The power supply unit according to claim 12,
wherein the smoothing capacitor is located between the thermistor and the input terminal.

14. The power supply unit according to claim 12,
wherein the substrate has a first side and a second side opposite to the first side when the substrate is viewed in plan view,
wherein the input terminal is located closer to the first side of the substrate than to the second side of the substrate, and
wherein the thermistor is located closer to the second side of the substrate than to the first side of the substrate.

15. The power supply unit according to claim 12, further comprising;
a rectifying circuit that rectifies alternating voltage input from the input terminal before input the smoothing capacitor and
an output terminal that outputs voltage smoothed by the smoothing capacitor, wherein the rectifying circuit and the output terminal are mounted on the substrate, and wherein a gap between the output terminal and the thermistor is longer than a gap between the output terminal and the rectifying circuit.

16. The power supply unit according to claim 15,
wherein the rectifying circuit is located between the thermistor and the output terminal.

17. The power supply unit according to claim 15,
wherein the thermistor is located between the rectifying circuit and the smoothing capacitor.

18. The power supply unit according to claim 17,
wherein a gap between the rectifying circuit and the thermistor is shorter than a gap between the smoothing capacitor and the thermistor.

19. The power supply unit according to claim 12,
wherein, in a case where the power supply unit supplies power to the printing apparatus, a temperature of the smoothing capacitor is higher than a temperature of the input terminal.

20. A power supply unit for a printing apparatus that has a plurality of functions including a printing function of forming an image on a medium and is capable of executing printing with resolution of 300 dpi or more, comprising:
a substrate;
a rectifying circuit that rectifies alternating voltage;
an output terminal that outputs voltage rectified by the rectifying circuit; and
a thermistor that detects a temperature,
wherein the output terminal, the rectifying circuit and the thermistor are mounted on the substrate, and
wherein a gap between the output terminal and the thermistor is longer than a gap between the output terminal and the rectifying circuit.

21. A power supply unit, comprising:
a substrate;
an input terminal that receives an alternating voltage from a power cable electrically connected to an alternating power supply;
a smoothing capacitor that smooths the alternating voltage input from the input terminal; and
a thermistor that detects a temperature,
wherein the input terminal, the smoothing capacitor, and the thermistor are mounted on the substrate, and
wherein a gap between the input terminal and the thermistor is longer than a gap between the input terminal and the smoothing capacitor.

22. A power supply unit, comprising:
a substrate;
a rectifying circuit that rectifies alternating voltage;
an output terminal that outputs voltage rectified by the rectifying circuit; and
a thermistor that detects a temperature,
wherein the output terminal, the rectifying circuit and the thermistor are mounted on the substrate, and wherein a gap between the output terminal and the thermistor is longer than a gap between the output terminal and the rectifying circuit.

* * * * *